Dec. 20, 1927.
F. S. CARR
FASTENER
Filed Aug. 25, 1925
1,653,598
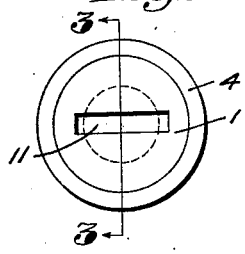
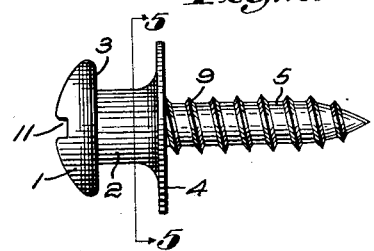
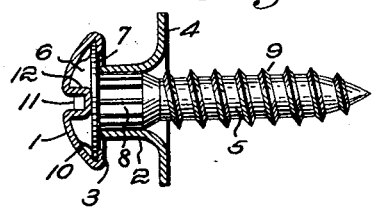
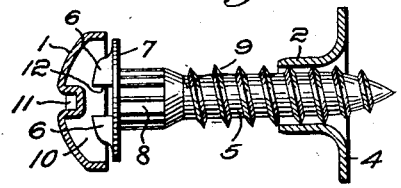
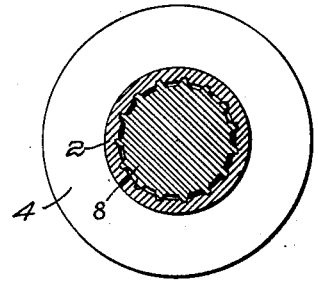
Inventor:
Fred S. Carr;
by Emery Booth Janney & Varney
Attys.

Patented Dec. 20, 1927.

1,653,598

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

FASTENER.

Application filed August 25, 1925. Serial No. 52,315.

This invention aims to provide an improved fastener stud.

In the drawings, which illustrate a preferred embodiment of my invention:—

Figure 1 is an end elevation of the stud;

Fig. 2 is a side elevation of the stud;

Fig. 3 is a section on the line 3—3 of Fig. 1 being partly in elevation;

Fig. 4 is a section of the cap and tubular parts together with the attaching screw before screwing them together; and Fig. 5 is an enlarged section on the line 5—5 of Fig. 2.

Referring to the drawings, I have shown a separable fastener stud which is particularly, though not exclusively, useful as a stud for use with slip covers for upholstery.

The stud as illustrated is formed of three separate pieces secured together to provide a stud having a relatively thin head 1, a relatively long neck 2, an abrupt shoulder 3 between the head and neck, a flat base portion 4 and an attaching screw 5.

The attaching screw 5 is provided with a rounded head portion 6, a relatively thin flange portion 7 adjacent to the head, a fluted portion 8 and a threaded shank 9.

The head 1 of the stud is provided by securing a pressed metal cap 10 to the head 6 of the screw end crimping a portion thereof beneath the flange 7, while a depressed portion 11 fits into the screw drive slot 12 to prevent rotation between the parts and provide means for receiving a tool to secure the stud to a support.

The neck and base of the stud are provided by forcing a tubular part over the fluted portion 8 of the screw, as shown in Figs. 3 and 5 so as to be held non-rotatable relative to the screw by the flutes which cut their way into the metal forming the neck of the stud. Assembly of the parts of the stud is effected by securing the parts, shown in Fig. 4, together as best illustrated in Fig. 3. Thus the cap and the tubular part are the only parts exposed when the stud is attached to a support.

By securing the parts together as above described, the stud may be easily and quickly assembled at the point of manufacture and shipped to the consumer completely assembled so that it is only necessary for the consumer to insert a tool in the slot, formed in the head of the stud, and turn the screw into a support.

The stud illustrated is particularly useful in connection with a slip cover that is provided with a button hole for engagement with the neck of the stud. However, any convenient type of socket may be used instead of the button hole. The screw 5 may be threaded into either a wooden support or a metal support. However if the stud is to be secured to a metal support the screw must be hardened so that the threads may cut their way through the metal.

While I have shown and described a preferred embodiment of my invention it will be understood that changes involving omission, substitution, alteration and reversal of parts and even changes in the mode of operation may be made without departing from the scope of my invention which is best defined in the appended claims.

Claims:

1. A fastener stud including a screw having a head, a cap member secured to said head to provide a stud head and a tubular flanged member secured in a fixed relation directly to said screw below said head to provide the neck and base of said stud.

2. A fastener stud including a screw having a head, a fluted portion below said head and a threaded shank portion beyond said fluted portion, a pressed metal one-piece cap secured directly to said screw head and a neck portion driven over said fluted portion and held against relative rotation by the flutes.

3. A fastener stud including a screw having a slotted head, a fluted portion and a threaded portion, a cap secured to the head of said screw to provide the stud head, said cap having a depressed portion fitted into the slot in the head of the screw to prevent relative rotation between the cap and the screw, and a tubular flanged portion held in place upon said screw by the flutes thereby to provide the neck and base of said stud.

4. A three part fastener stud including an attaching part, a cap part positively interlocked with said attaching part and providing a stud head and a flanged tubular part secured directly to said attaching part below said cap to provide a relatively long neck portion and a base portion for said stud.

In testimony whereof, I have signed my name to this specification.

FRED S. CARR.